(12) United States Patent
Littlejohn et al.

(10) Patent No.: US 10,765,264 B2
(45) Date of Patent: Sep. 8, 2020

(54) DISPOSABLE CUTTING BOARDS

(71) Applicant: GPCP IP Holdings LLC, Atlanta, GA (US)

(72) Inventors: Mark B. Littlejohn, Appleton, WI (US); Michael A. Breining, Neenah, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 95 days.

(21) Appl. No.: 14/943,694

(22) Filed: Nov. 17, 2015

(65) Prior Publication Data

US 2016/0135648 A1 May 19, 2016

Related U.S. Application Data

(60) Provisional application No. 62/080,659, filed on Nov. 17, 2014.

(51) Int. Cl.
*A47J 47/00* (2006.01)

(52) U.S. Cl.
CPC .................................. *A47J 47/005* (2013.01)

(58) Field of Classification Search
CPC .. A47J 47/005; B31B 50/0012; B31B 50/001; B65D 1/40; B65D 1/42; B65D 5/00
See application file for complete search history.

(56) References Cited

U.S. PATENT DOCUMENTS

| D232,998 | S | 10/1974 | Molzen |
| D239,689 | S | 4/1976 | Doman et al. |
| 5,050,791 | A * | 9/1991 | Bowden ................... B65D 1/34 |
| | | | 229/407 |
| 5,472,790 | A | 12/1995 | Thompson |
| D431,421 | S | 10/2000 | Liu |

(Continued)

FOREIGN PATENT DOCUMENTS

| CA | 2422713 A1 * | 4/2002 | ............ A47J 47/005 |
| CA | 2475816 A1 | 8/2003 | |

(Continued)

OTHER PUBLICATIONS

Product Specification Catalog. 2013. Sabert. (Year: 2013).*

(Continued)

*Primary Examiner* — Lee D Wilson
*Assistant Examiner* — Joel D Crandall

(57) ABSTRACT

Pressware products, such as disposable cutting boards and trays, are provided. A disposable cutting board can include an inner sidewall extending upwardly from a bottom panel, a flange portion that extends outwardly from the sidewall, a first annular transition extending upwardly and outwardly from the bottom panel to a first end of the sidewall, and a second annular transition extending outwardly from a second end of the sidewall to a first end of the flange. The bottom panel can have a surface area of about 300 cm² to about 1,000 cm², and the disposable cutting board can have a height of about 3 mm to about 10 mm. The disposable cutting board can further have an FPI rigidity of about 85 grams or more and a product to blank perimeter (P1/P2) ratio of about 90% to about 99%.

35 Claims, 3 Drawing Sheets

(56) References Cited

U.S. PATENT DOCUMENTS

| | | | |
|---|---|---|---|
| 6,164,478 A | 12/2000 | Cant | |
| D441,261 S | 5/2001 | Stein | |
| 6,422,551 B1 | 7/2002 | Brotz | |
| 6,913,255 B2 | 7/2005 | Porchia et al. | |
| 6,979,485 B2 | 12/2005 | Price et al. | |
| 6,986,931 B2 | 1/2006 | Ackerman et al. | |
| 6,991,844 B2 | 1/2006 | LeBoeuf et al. | |
| 6,994,335 B2 | 2/2006 | Porchia et al. | |
| 7,022,395 B2 | 4/2006 | Ackerman et al. | |
| 7,026,034 B2 | 4/2006 | LeBoeuf et al. | |
| 7,048,987 B2 | 5/2006 | Price et al. | |
| 7,056,569 B2 | 6/2006 | Price et al. | |
| 7,063,879 B2 | 6/2006 | Trent et al. | |
| 7,063,880 B2 | 6/2006 | Karul | |
| 7,078,088 B2 | 7/2006 | Price et al. | |
| 7,208,216 B2 | 4/2007 | Ackerman et al. | |
| 8,141,860 B2 | 3/2012 | Goldman | |
| 2003/0198797 A1 | 10/2003 | LeBoeuf et al. | |
| 2004/0056403 A1* | 3/2004 | Porchia | A47J 47/005 269/289 R |
| 2004/0154729 A1 | 8/2004 | LeBoeuf et al. | |
| 2004/0157042 A1 | 8/2004 | Ackerman et al. | |
| 2004/0157051 A1 | 8/2004 | Trent et al. | |
| 2004/0224134 A1 | 11/2004 | Trent et al. | |
| 2006/0194456 A1* | 8/2006 | Cawley | A47J 47/005 439/74 |
| 2006/0208054 A1* | 9/2006 | Littlejohn | B65D 1/34 229/406 |
| 2007/0170629 A1 | 7/2007 | Goldman | |
| 2008/0048376 A1* | 2/2008 | Farmer | A47J 36/04 269/289 R |
| 2010/0264202 A1* | 10/2010 | Littlejohn | B65D 1/34 229/406 |
| 2012/0248180 A1* | 10/2012 | White | A47G 19/03 229/407 |

FOREIGN PATENT DOCUMENTS

| | | |
|---|---|---|
| CA | 2515620 A1 | 8/2004 |
| CA | 2515678 A1 | 8/2004 |
| DE | 29908239 U1 | 3/2000 |
| WO | 0228577 A2 | 4/2002 |
| WO | 03068492 A2 | 8/2003 |
| WO | 2004071756 A1 | 8/2004 |
| WO | 2004071757 A1 | 8/2004 |
| WO | 2005123383 A1 | 12/2005 |
| WO | 2007084723 A2 | 7/2007 |

OTHER PUBLICATIONS

FPI Rigidity Tester, Foodservice Packaging Institute; 1 page; downloaded from http://www.fpi.org/ on Oct. 26, 2017.

FPI Rigidity Tester Operating Procedure, Foodservice Packaging Institute, Updated Jan. 23, 2015; 17 pages; downloaded from http://www.fpi.org/ on Oct. 26, 2017.

* cited by examiner

DISPOSABLE CUTTING BOARDS

BACKGROUND

Field

Embodiments described herein generally relate to pressware products. More particularly, such embodiments relate to pressed paperboard products, such as disposable cutting boards and trays.

Description of the Related Art

Traditional cutting boards can be a source of food contamination. Such food contamination can include the transfer of bacteria, viruses, food particles, liquids, juices, fats, grease, or overwhelming flavors from one food item to another that both contact the cutting board during the preparation and handling of various food items.

Disposable cutting sheets have been used to reduce or eliminate the potential of food contamination if the cutting sheets are used with only one food type and discarded after each use. Disposable cutting sheets are generally formed of thin plastic films and are flimsy and easily punctured or cut. This lack of rigidity reduces the usefulness of disposable cutting sheets when preparing food since the cutting sheets cannot be used to support heavy food items when transporting the food, such as when carrying from a countertop to a stovetop.

Various paper products, such as paper sheets, plates, or trays, have also been used to reduce or eliminate food contamination. However, like disposable cutting sheets, many of the paper products can also be easily punctured, cut, or torn. Paper sheets can be inexpensively fabricated at dimensions similar to traditional cutting boards. However, paper sheets are flat and thus do not have means for containing escaping liquids that typically are released by food items prepared thereon. The dimensions of paper plates can be a limitation for being effective cutting trays. Round paper plates with typical diameters of 6 inches to 10 inches, for example, do not possess enough usable surface area and have sidewalls that hinder or prohibit the ability to cut, serve, or otherwise prepare food items thereon. Paper trays, however, are generally much larger than paper plates, but also lack the needed rigidity for supporting heavy food items.

There is a need, therefore, for cutting boards and trays made from disposable paperboard.

SUMMARY

In one or more embodiments, a disposable cutting board can include a bottom panel having a surface area (SA) of about 300 cm$^2$ to about 1,000 cm$^2$, a sidewall that can extend upwardly from the bottom panel, a flange portion that can extend outwardly from the sidewall, a first annular transition that can extend upwardly and outwardly from the bottom panel to a first end of the sidewall, and a second annular transition that can extend outwardly from a second end of the sidewall to a first end of the flange. The disposable cutting board can have a height (H) of about 3 mm to about 10 mm, and can have an FPI rigidity of about 85 grams or more, as measured by the Foodservice Packaging Institute rigidity system standard expressed in grams of force per 0.5 inches of deflection. In some embodiments, the disposable cutting board can also have a product to blank perimeter (P1/P2) ratio of about 90% to about 99%, where P1 is defined by the outermost circumference of the disposable cutting board, and P2 is defined by the outermost circumference of the generally planar paperboard blank.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the invention may admit to other equally effective embodiments.

DETAILED DESCRIPTION

Figure 1:
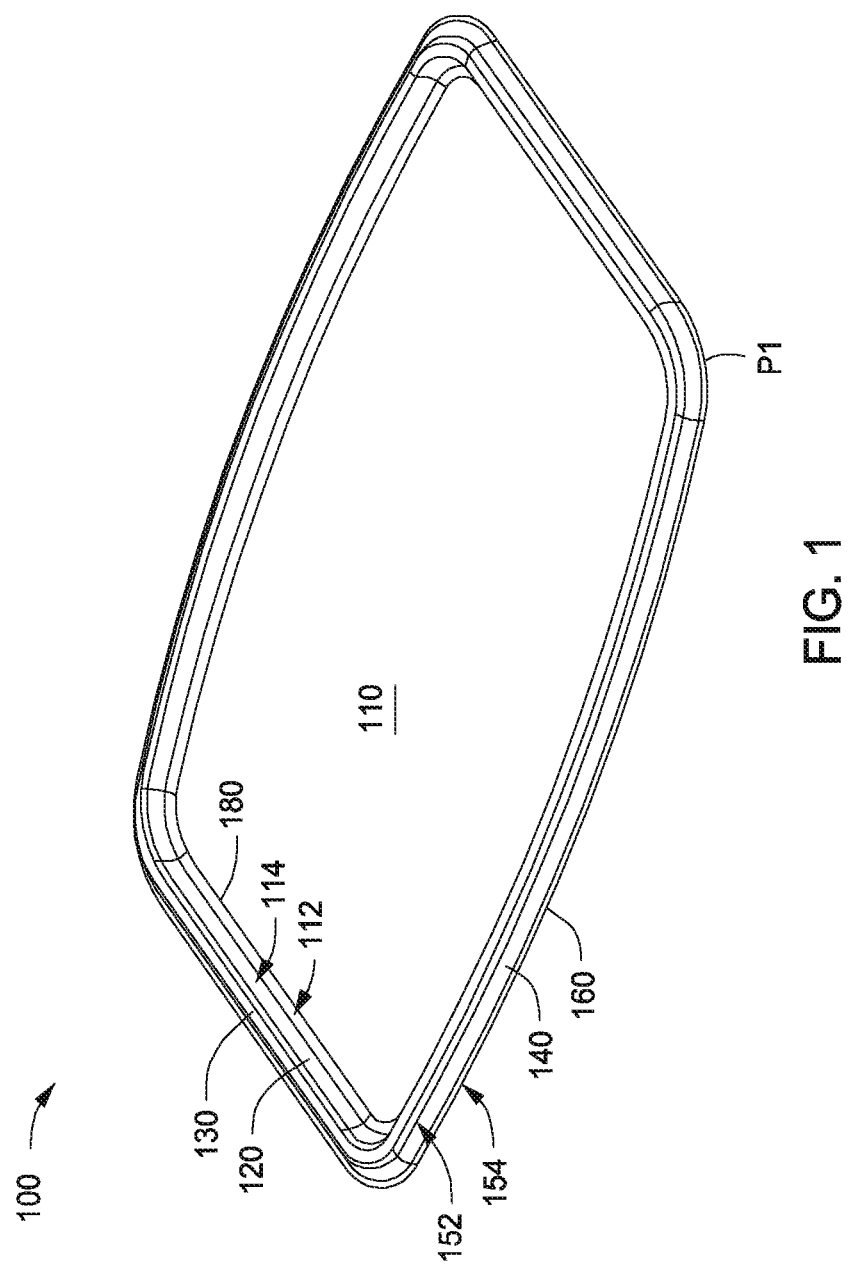
FIG. 1 depicts a perspective view of a illustrative disposable cutting board, according to one or more embodiments described.
Figure 2:
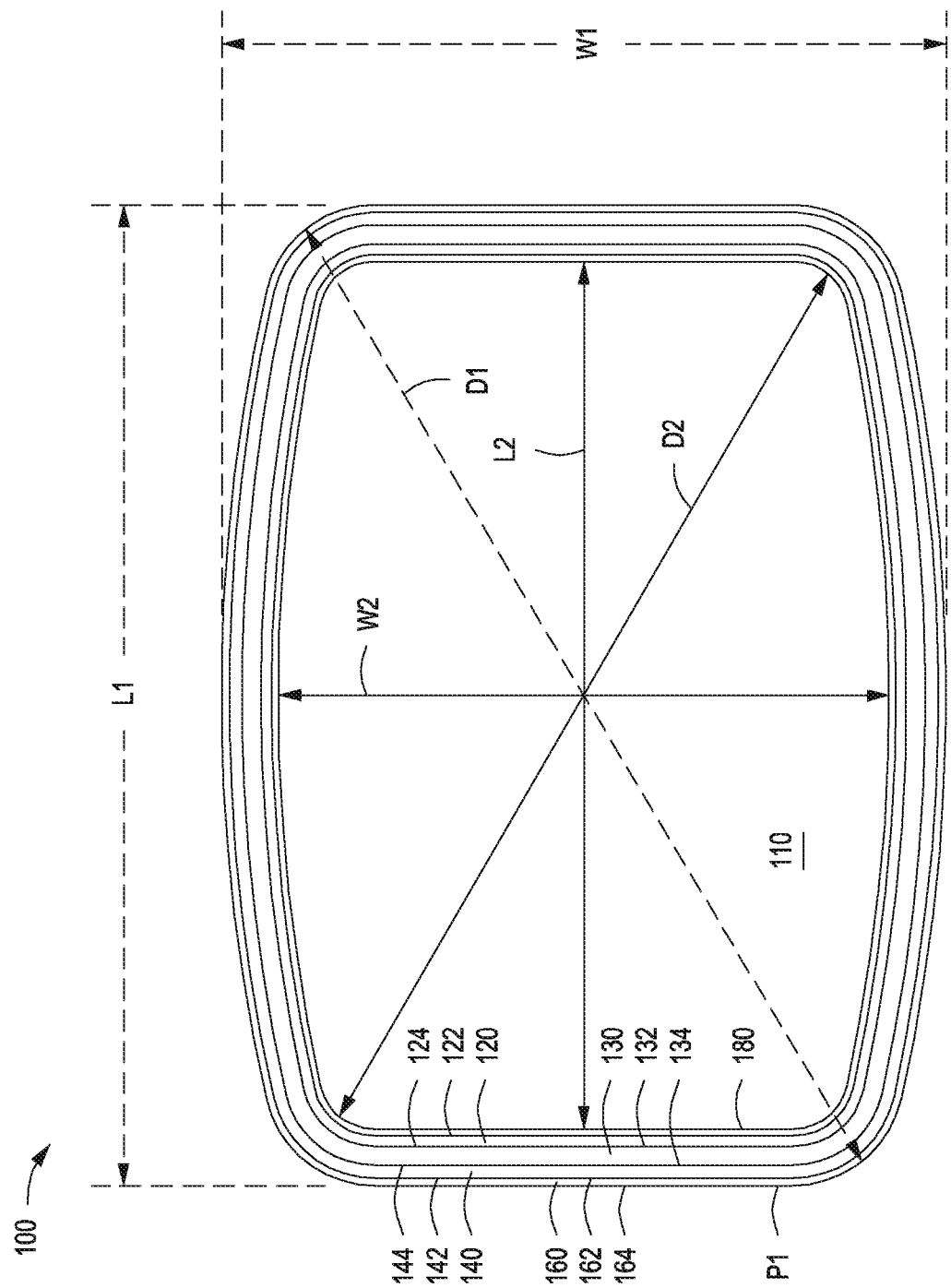
FIG. 2 depicts a perspective top view of the disposable cutting board depicted in FIG. 1, according to one or more embodiments described.

FIG. 1 depicts a perspective view of an illustrative disposable cutting board 100 and FIG. 2 depicts a perspective top view of the disposable cutting board 100. The disposable cutting board 100 has a large surface area and low profile and still exhibits a relative high degree of rigidity. The disposable cutting board 100 can be any non-round or non-circular tray or board for use with the preparation, transportation, or other service of food. As depicted in FIGS. 1 and 2, for example, the disposable cutting board 100 can have a bottom panel 110, an inner sidewall 120 that can extend upwardly from the bottom panel 110, and a flange 130 that can extend outwardly from the inner sidewall 120. The disposable cutting board 100 can also have a first annular transition 112 that can extend upwardly and outwardly from the bottom panel 110 to a first end 122 of the inner sidewall 120. A second annular transition 114 can extend outwardly from a second end 124 of the inner sidewall 120 to a first end 132 of the flange 130.

An outer sidewall 140 can extend downwardly and outwardly from the flange 130, and an evert 160 can extend outwardly from the outer sidewall 140. A third annular transition 152 can extend downwardly and outwardly from a second end 134 of the flange 130 to a first end 142 of the outer sidewall 140. A fourth annular transition 154 can extend outwardly from a second end 144 of the outer sidewall 140 to a first end 162 of the evert 160. A second end 164 of the evert 160 can extend outwardly from the first end 162 of the evert 160. The second end 164 of the evert 160 can be used or referred to as an evert perimeter.

An annular ring or recessed channel 180 can be formed in a peripheral portion of the bottom panel 110. This recessed channel 180 can be used to collect liquids that emit from the food. Such liquids would typically include water, fruit or vegetable juice, marinates, dressings, oil, grease, gravy, blood, or other food related liquids. The recessed channel 180 can be formed, pressed, creased, or otherwise formed into the disposable cutting board 100. The recessed channel 180 can provide increased structural integrity and rigidity of the disposable cutting board 100. In some embodiments, when cutting or otherwise preparing food items on the disposable cutting board 100, the recessed channel 180 can help stabilize the disposable cutting board 100 from rocking or otherwise moving. In another embodiment, not shown, the disposable cutting board 100 does not have a recessed channel.

The disposable cutting board 100 can have various shapes and sizes including multi-sided or polygonal shapes which have straight, arched, or curved sides, or any combination thereof. For example, the disposable cutting board 100 and/or the paperboard blank can be a polygonal shape having angled corners or rounded corners. In some examples, the disposable cutting board 100 and/or the paperboard blank can be a polygonal shape that has at least two arched sides. For example, the disposable cutting board 100 and/or the paperboard blank can be a polygonal shape that has at least two arched sides opposite of each other and at least two straight sides opposite and parallel of each other. Illustrative polygonal shapes can include a triangle, rectangle, square, pentagon, hexagon, heptagon, octagon, nonagon, decagon, trapezoid, rhombus, or other polygons. For ease of description, however, the disposable cutting board 100 will be further described below in terms of a polygonal having an outer length (L1), outer width (W1), and outer diameter (D1), inner length (L2), inner width (W2), and inner diameter (D2).

Figure 3:
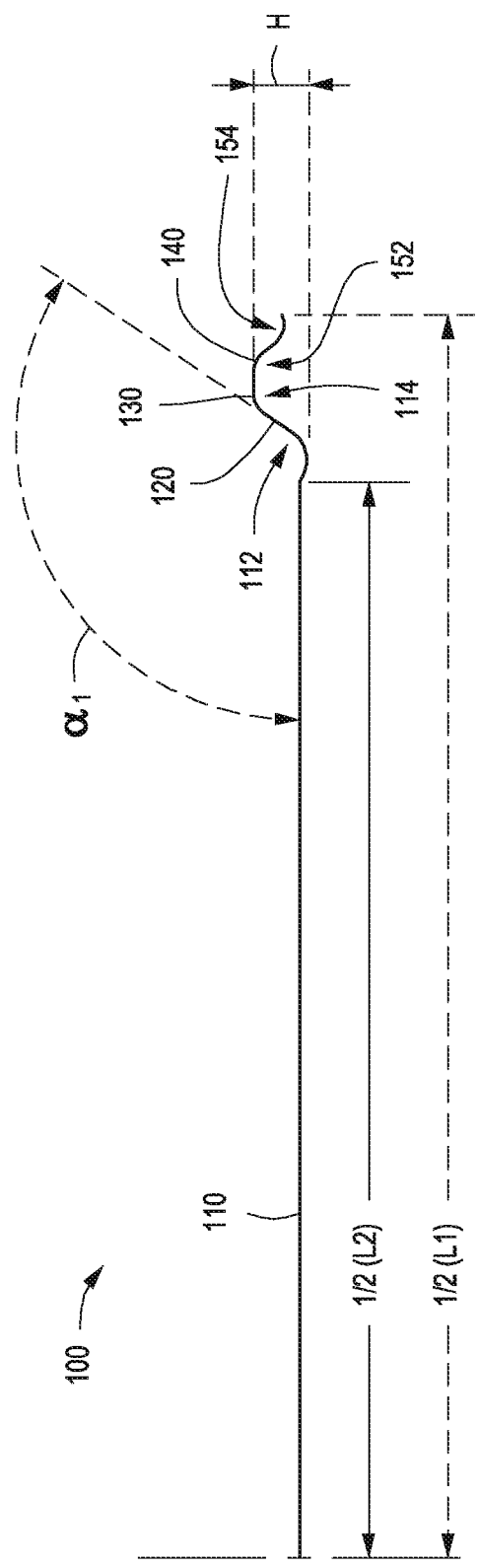
FIG. 3 depicts an illustrative, partial sectional view of the disposable cutting board depicted in FIG. 1, according to one or more embodiments described.
Figure 4:
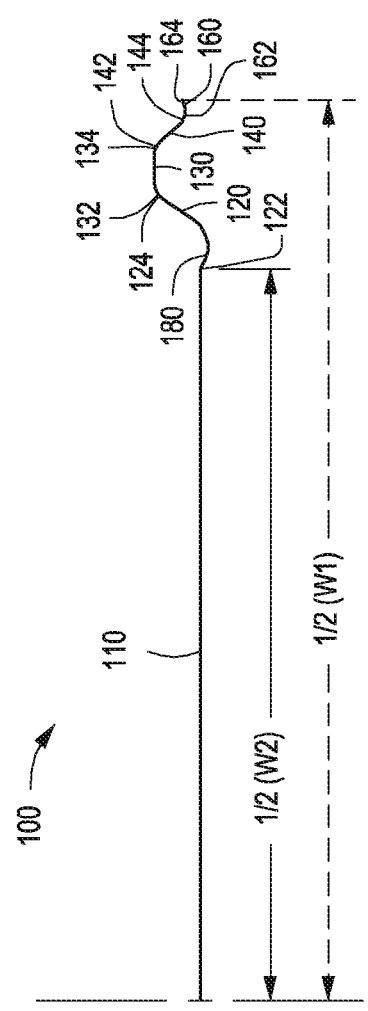
FIG. 4 depicts another illustrative, partial sectional view of the disposable cutting board depicted in FIG. 1, according to one or more embodiments described.

FIG. 3 depicts a partial sectional view through the long side of the disposable cutting board 100. One half of the outer length (½ L1) and one half of the inner length (½ L2) are illustrated from the center of the disposable cutting board 100 to the second end 164 of the evert 160 and the edge of the bottom panel 110, respectively. Similarly, FIG. 4 depicts a partial sectional view through the short side of the disposable cutting board 100. One half of the outer width (½ W1) and one half of the inner width (½ W2) are illustrated from the center of the disposable cutting board 100 to the second end 164 of the evert 160 and the edge of the bottom panel 110, respectively.

The disposable cutting board 100 has a low profile, as indicated by the height (H). The height (H) is the vertical distance extending between the bottom of the recessed channel 180 and the plane of the flange 130, as depicted in FIG. 3. In embodiments that the disposable cutting board 100 does not have the recessed channel 180, not shown, the height (H) is the vertical distance extending between the bottom panel 110 and a plane passing across the flange 130. The height (H) can range from a low of about 3 mm, about 4 mm, about 5 mm, or about 6 mm to a high of about 7 mm, about 8 mm, about 9 mm, or about 10 mm. The height (H) can also be about 3 mm to about 10 mm, about 3 mm to about 8 mm, about 3 mm to about 6 mm, about 4 mm to about 10 mm, about 4 mm to about 8 mm, about 4 mm to about 7 mm, about 4 mm to about 6 mm, about 4 mm to about 5 mm, about 5 mm to about 10 mm, about 5 mm to about 9 mm, about 5 mm to about 8 mm, or about 5 mm to about 7 mm.

Still referring to FIGS. 3 and 4, the inner sidewall 120 can extend upwardly and outwardly from the bottom panel 110 at an angle $\alpha_1$, as measured from the plane of the bottom panel 110 to the plane of the inner sidewall 120. The angle $\alpha_1$, therefore, is depicted extending outwardly, greater than 90°. The angle $\alpha_1$ can range from a low of greater than 90°, about 95°, about 100°, or about 105° to a high of about 110°, about 120°, about 130°, about 140°, or about 150°. The angle $\alpha_1$ can also be greater than 90° to about 145°, greater than 90° to about 135°, greater than 90° to about 125°, greater than 90° to about 120°, greater than 90° to about 110°, or greater than 90° to about 100°. For example, the angle $\alpha_1$ can be about 95° to about 145°, about 95° to about 135°, about 95° to about 125°, about 95° to about 120°, about 95° to about 115°, about 95° to about 110°, about 95° to about 105°, or about 95° to about 100°. In other examples, the angle $\alpha_1$ can be about 105° to about 145°, about 105° to about 135°, about 105° to about 130°, about 105° to about 125°, about 105° to about 120°, about 105° to about 115°, or about 105° to about 110°. In some specific examples, the angle $\alpha_1$ can be about 100° to about 135°, about 100° to about 130°, about 100° to about 125°, about 100° to about 120°, about 100° to about 115°, about 110° to about 135°, about 110° to about 130°, about 110° to about 125°, about 110° to about 120°, or about 110° to about 115°.

The disposable cutting board 100 can include or can be formed from one or more types of materials and/or one or more layers that can provide a suitable rigidity. In some embodiments, the disposable cutting board 100 can include or can be formed, pressed, press-formed, molded, or otherwise made from paper, paperboard, fiber, fibrous materials, fiberboard, pulp, pulp molded paper, pulp molded paperboard, webbing, clay, starch, sizing agents, natural or synthetic materials, plastic or polymeric fibers or materials including acrylic, styrene acrylic, polyethylene, polypropylene, polyethylene terephthalate, latex, or any mixture thereof. The disposable cutting board 100 can include one or more layers, films, laminates, or materials coated thereon and/or contained within. In some examples, the disposable cutting board 100 can include a clay coating, an acrylic-based coating, and/or an extruded coating or laminate film that can include polyethylene, polypropylene, polyethylene terephthalate, derivatives thereof, or any mixture thereof. The disposable cutting board 100 can include or can be formed from one or multiple layers. In some examples, the disposable cutting board 100 can include or can be formed from 1 to 15, or more layers, for example, but not limited to, a paperboard that contains multiple layers or films.

In one or more embodiments, the disposable cutting board 100 can be manufactured or otherwise formed from coated paperboard, such as a clay coated paperboard blank or substrate. The paperboard blank or substrate can be printed with a design or decoration and coated with a grease and/or water resistant barrier. In some examples, the paperboard blank can be completely planar or substantially planar prior to being pressed and formed into the disposable cutting board 100. In some embodiments, the paperboard blank can be scored and/or pleated. For example, the paperboard blank can have one or more scores disposed or otherwise formed in or at each corner. The paperboard blank can have one, two, three, four, five, six, seven, eight, or more scores at each corner, such as, for example, but not limited to, about three scores to about six scores.

The disposable cutting board 100 and/or the paperboard blank can include two or more sides of different lengths, such that the disposable cutting board 100 and/or the paperboard blank can include one or more long sides and/or one or more short sides (e.g., relative to the long sides). In some embodiments, the disposable cutting board 100 and/or the paperboard blank can include one or more sets of long sides (e.g., two or more long sides) and one or more sets of short sides (e.g., two or more short sides). The disposable cutting board 100, as depicted in FIG. 2, can have the long sides along an outer length (L1) that are arched sides and can have the short sides along an outer width (W1) that are straight sides. The arched sides of the disposable cutting board 100 can provide additional rigidity and/or strength to resist twisting. The arched sides of the disposable cutting board 100 can also provide additional space for cutting or otherwise preparing food items.

The paperboard blank used to form the disposable cutting board 100 can also have arched long sides and straight short sides. In other embodiments, the disposable cutting board 100 and/or the paperboard blank can have straight long sides and short arched sides, long and short arched sides, or long and short straight sides. For example, the disposable cutting board 100 and/or the paperboard blank can include a pair of outwardly arching long sides, a pair of straight and parallel short sides, and angled or rounded corners. As another example, the paperboard blank can have a pair of outwardly arching long sides, a pair of straight and parallel short sides, rounded corners disposed between each side (e.g., a total of four rounded corners), and three scores to about six scores formed on each rounded corner.

The disposable cutting board 100 can maintain a relatively high degree of rigidity despite having a relatively large surface area of the bottom panel 110 and low profile (e.g., relatively short height (H) of the disposable cutting board 100). The disposable cutting board 100 can be evaluated for FPI rigidity, that can be expressed in grams of force per 0.5 inches of deflection. The FPI Rigidity can be measured using a Food Service Packaging Institute Rigidity Tester, available from or through the Food Service Packaging Institute, 150 S. Washington Street, Suite 204, Falls Church, Va. 22046.

In some examples, the FPI rigidity of the disposable cutting board 100 can be a low of about 80 grams, about 90 grams, or about 100 grams to a high of about 120 grams, about 140 grams, about 160 grams, or about 180 grams, as measured by the Foodservice Packaging Institute rigidity system standard expressed in grams of force per 0.5 inches of deflection. In other examples, the FPI rigidity of the disposable cutting board 100 can be a low of about 100 grams, about 110 grams, or about 120 grams to a high of about 150 grams, about 160 grams, or about 170 grams, as measured by the Foodservice Packaging Institute rigidity system standard expressed in grams of force per 0.5 inches of deflection. In other examples, the FPI rigidity of the disposable cutting board 100 can be a low of about 110 grams, about 120 grams, or about 130 grams to a high of about 140 grams, about 150 grams, or about 160 grams, as measured by the Foodservice Packaging Institute rigidity system standard expressed in grams of force per 0.5 inches of deflection.

A basis weight of the disposable cutting board 100 and/or the paperboard blank can be a low of about 150 lbs/3,000 ft$^2$, about 175 lbs/3,000 ft$^2$, or about 200 lbs/3,000 ft$^2$ to a high of about 250 lbs/3,000 ft$^2$, about 275 lbs/3,000 ft$^2$, about 300 lbs/3,000 ft$^2$. For example, the basis weight of the disposable cutting board 100 and/or the paperboard blank can be about 175 lbs/3,000 ft$^2$ to about 300 lbs/3,000 ft$^2$, about 185 lbs/3,000 ft$^2$ to about 275 lbs/3,000 ft$^2$, about 200 lbs/3,000 ft$^2$ to about 250 lbs/3,000 ft$^2$, or about 210 lbs/3,000 ft$^2$ to about 230 lbs/3,000 ft$^2$. A caliper of the disposable cutting board 100 and/or the paperboard blank can be a low of about 10 mils, about 13 mils, about 15 mils, or about 18 mils to a high of about 22 mils, about 24 mils, about 27 mils, or about 30 mils. For example, the caliper of the disposable cutting board 100 and/or the paperboard blank can be about 10 mils to about 30 mils, about 13 mils to about 27 mils, about 15 mils to about 24 mils, about 16 mils to about 23 mils, or about 18 mils to about 20 mils.

In one or more embodiments, the disposable cutting board 100 and/or the paperboard blank can have a basis weight of about 150 lbs/3,000 ft$^2$ to about 300 lbs/3,000 ft$^2$ and a caliper of about 13 mils to about 27 mils. In other examples, the disposable cutting board 100 and/or the paperboard blank can have a basis weight of about 175 lbs/3,000 ft$^2$ to about 300 lbs/3,000 ft$^2$ and a caliper of about 15 mils to about 23 mils. In other examples, the disposable cutting board 100 and/or the paperboard blank can have a basis weight of about 200 lbs/3,000 ft$^2$ to about 250 lbs/3,000 ft$^2$ and a caliper of about 18 mils to about 23 mils. In other examples, the disposable cutting board 100 and/or the paperboard blank can have a basis weight of about 210 lbs/3,000 ft$^2$ to about 230 lbs/3,000 ft$^2$ and a caliper of about 19 mils to about 21 mils.

The product perimeter (P1) of the disposable cutting board 100 can be measured around the outermost circumference of the disposable cutting board 100. In some examples, as depicted in FIGS. 1 and 2, the second end 164 of the evert 160 can be the product perimeter (P1) of the disposable cutting board 100. Therefore, in such examples, the second end 164 of the evert 160 can be defined or otherwise referred to as the evert perimeter. In one or more embodiments, the product perimeter (P1) of the disposable cutting board 100 can be a low of about 20 inches, about 25 inches, about 30 inches, or about 35 inches to a high of about 40 inches, about 55 inches, or about 75 inches. For example, the disposable cutting board 100 can be about 8 inches by about 11 inches and have a product perimeter (P1) of about 38 inches. In other embodiments, the product perimeter (P1) of the disposable cutting board 100 can be a low of about 25 inches, about 35 inches, or about 40 inches to a high of about 50 inches, about 60 inches, or about 80 inches. For example, the disposable cutting board 100 can be about 10 inches by about 13 inches and have a product perimeter (P1) of about 46 inches.

The blank perimeter (P2) of the blank or substrate used to form the disposable cutting board 100 can be measured around the outermost circumference of the blank or substrate. In some examples, the blank or substrate can be a generally planar paperboard blank or substrate with the blank perimeter (P2), and the disposable cutting board 100 can be formed, pressed, press-formed, or otherwise made from the generally planar paperboard blank or substrate. In one or more embodiments, the blank perimeter (P2) of the blank or substrate used to form the disposable cutting board 100 can be a low of about 20 inches, about 25 inches, about 30 inches to a high of about 40 inches, about 55 inches, or about 75 inches. In other embodiments, the blank perimeter (P2) of the blank or substrate used to form the disposable cutting board 100 can be a low of about 25 inches, about 35 inches, or about 40 inches to a high of about 50 inches, about 60 inches, or about 80 inches.

The disposable cutting board 100 having a product perimeter (P1) can be formed, pressed, or otherwise made from a blank or substrate (e.g., planar paperboard blank) having a blank perimeter (P2). A product to blank perimeter (P1/P2) ratio can be determined by dividing the product perimeter (P1) of the disposable cutting board 100 by the blank perimeter (P2) of the generally planar paperboard blank or substrate, for example, the ratio of P1/P2. The product perimeter (P1) is defined by the outermost circumference of the disposable cutting board and the blank perimeter (P2) is defined by the outermost circumference of the generally planar paperboard blank or substrate.

The product to blank perimeter (P1/P2) ratio of the disposable cutting board 100 can be a low of about 90%, about 92%, or about 94% to a high of about 95%, about 97%, about 98%, about 98.5%, or about 99%. For example, the product to blank perimeter (P1/P2) ratio of the disposable cutting board 100 can be about 92% to about 99%, about 94% to about 98.5%, about 95% to about 98.5%, about 96% to about 98%, or about 96.5% to about 97.5%. In some examples, the evert perimeter can be equal to the product perimeter (P1) and the product to blank perimeter (P1/P2) ratio can be greater than 92%, greater than 94%, or greater than 95% to about 96%, about 97%, about 98%, or about 99%.

The outer length (L1) of the disposable cutting board 100 can be a low of about 15 cm, about 20 cm, about 25 cm, or about 30 cm to a high of about 40 cm, about 50 cm, or about 60 cm. The outer length (L1) of the disposable cutting board 100 can also be about 15 cm to about 60 cm, about 20 cm to about 50 cm, about 25 cm to about 50 cm, about 25 cm to about 45 cm, about 25 cm to about 40 cm, or about 25 cm to about 35 cm.

The outer width (W1) of the disposable cutting board 100 can be a low of about 15 cm, about 20 cm, about 25 cm, or about 30 cm to a high of about 40 cm, about 50 cm, or about 60 cm. The outer width (W1) of the disposable cutting board 100 can also be about 15 cm to about 60 cm, about 20 cm to about 50 cm, about 25 cm to about 50 cm, about 25 cm to about 45 cm, about 25 cm to about 40 cm, or about 25 cm to about 35 cm.

In some examples, the outer length (L1) can be about 20 cm to about 50 cm and the outer width (W1) can be about 20 cm to about 40 cm. In other examples, the outer length (L1) can also be about 22 cm to about 40 cm and the outer width (W1) can be about 25 cm to about 40 cm. In other examples, the outer length (L1) can also be about 20 cm to about 50 cm and the outer width (W1) can be about 12 cm to about 35 cm. In other examples, the outer length (L1) can also be about 25 cm to about 38 cm and the outer width (W1) can be about 15 cm to about 30 cm.

The outer diameter (D1) of the disposable cutting board 100 can range from a low of about 20 cm, about 25 cm, about 30 cm, or about 40 cm to a high of about 45 cm, about 50 cm, about 60 cm, or about 70 cm. The outer diameter (D1) can also range from about 20 cm to about 70 cm, about 20 cm to about 60 cm, about 25 cm to about 60 cm, about 25 cm to about 50 cm, or about 25 cm to about 40 cm.

The disposable cutting board 100 can have a characteristic diameter (CD). As used herein, the characteristic diameter (CD) is an average of the outer length (L1) and the outer width (W1), as measured through the center of the disposable cutting board 100. In some examples, the characteristic diameter (CD) can be about 15 cm, about 20 cm, about 25 cm, or about 30 cm to about 35 cm, about 40 cm, about 50 cm, or about 60 cm. For example, the characteristic diameter (CD) of the disposable cutting board 100 can be about 20 cm to about 60 cm, about 20 cm to about 45 cm, about 20 cm to about 35 cm, about 20 cm to about 30 cm, about 25 cm to about 60 cm, about 25 cm to about 45 cm, about 25 cm to about 40 cm, or about 25 cm to about 35 cm.

In some examples, the inner length (L2) of the bottom panel 110 can be about 8 cm, about 12 cm, or about 18 cm to about 28 cm, about 40 cm, or about 50 cm. For example, the inner length (L2) of the bottom panel 110 can also be about 10 cm to about 50 cm, about 15 cm to about 45 cm, about 15 cm to about 40 cm, about 15 cm to about 35 cm, about 20 cm to about 45 cm, about 20 cm to about 40 cm, about 25 cm to about 50 cm, or about 25 cm to about 40 cm.

The inner width (W2) of the bottom panel 110 can be about 8 cm, about 18 cm, or about 24 cm to about 30 cm, about 44 cm, or about 50 cm. For example, the inner width (W2) of the bottom panel 110 can also be about 10 cm to about 50 cm, about 10 cm to about 45 cm, about 10 cm to about 40 cm, about 10 cm to about 35 cm, about 15 cm to about 50 cm, about 15 cm to about 45 cm, about 15 cm to about 40 cm, about 15 cm to about 35 cm, about 20 cm to about 45 cm, about 20 cm to about 35 cm, about 20 cm to about 45 cm, about 20 cm to about 35 cm, about 25 cm to about 45 cm, about 25 cm to about 45 cm, about 25 cm to about 35 cm, or about 25 cm to about 30 cm.

The inner diameter (D2) can be about 15 cm, about 20 cm, or about 35 cm to a high of about 40 cm, about 45 cm, or about 50 cm. For example, the inner diameter (D2) can also be about 15 cm to about 50 cm, about 15 cm to about 45 cm, about 15 cm to about 40 cm, about 15 cm to about 35 cm, about 15 cm to about 30 cm, about 15 cm to about 25 cm, about 20 cm to about 50 cm, about 20 cm to about 45 cm, about 20 cm to about 40 cm, about 20 cm to about 35 cm, about 20 cm to about 30 cm, about 25 cm to about 50 cm, about 25 cm to about 45 cm, or about 25 cm to about 40 cm.

The bottom panel 110 can have a surface area (SA). The surface area (SA) can be calculated using the inner length (L2), the inner width (W2), and/or the inner diameter (D2) depending on the specific geometry of the bottom panel 110. In some examples, the surface area (SA) of the bottom panel 110 can be a low of about 300 cm$^2$, about 500 cm$^2$, or about 600 cm$^2$ to a high of about 900 cm$^2$, about 1,000 cm$^2$, about 1,100 cm$^2$, about 1,500 cm$^2$, about 1,800 cm$^2$, or about 2,000 cm$^2$. In other examples, the surface area (SA) of the bottom panel 110 can be about 300 cm$^2$ to about 2,000 cm$^2$, about 300 cm$^2$ to about 1,400 cm$^2$, about 300 cm$^2$ to about 1,200 cm$^2$, about 300 cm$^2$ to about 1,100 cm$^2$, about 300 cm$^2$ to about 900 cm$^2$, about 300 cm$^2$ to about 700 cm$^2$, or about 300 cm$^2$ to about 500 cm$^2$. In some examples, the surface area (SA) of the bottom panel 110 can be about 500 cm$^2$ to about 2,000 cm$^2$, about 500 cm$^2$ to about 1,600 cm$^2$, about 500 cm$^2$ to about 1,200 cm$^2$, about 500 cm$^2$ to about 900 cm$^2$, or about 500 cm$^2$ to about 700 cm$^2$.

The characteristic diameter (H/CD) ratio of the disposable cutting board 100 can be determined by dividing the height (H) of the disposable cutting board 100 by the characteristic diameter (CD) of the disposable cutting board 100. The disposable cutting board 100 can have a height to characteristic diameter (H/CD) ratio of about 0.01, about 0.015, about 0.02, about 0.025, about 0.03, about 0.035, about 0.04, about 0.045, about 0.05, about 0.055, about 0.06, about 0.065, about 0.07, about 0.075, about 0.08, about 0.085, about 0.09, about 0.095, or less than 0.1. The height to characteristic diameter (H/CD) ratio can also be about 0.01 to about 0.09, about 0.01 to about 0.08, about 0.01 to about 0.07, about 0.01 to about 0.06, about 0.01 to about 0.05, about 0.01 to about 0.04, or about 0.01 to about 0.03.

In some embodiments, the height (H) of the disposable cutting board 100 can be about 3 mm to about 10 mm and the H/CD ratio can be about 0.01 to about 0.07. For example, the disposable cutting board 100 can have a height (H) of about 4 mm to about 8 mm and a H/CD ratio of about 0.01 to about 0.05. In other examples, the disposable cutting board 100 can have a height (H) of about 5 mm to about 7 mm and a H/CD ratio of about 0.01 to about 0.04 or about 0.01 to about 0.03. In other examples, the disposable cutting board 100 can have an outer length (L1) of about 20 cm to about 50 cm, an outer width (W1) of about 15 cm to about 40 cm, and a H/CD ratio of about 0.01 to about 0.05.

In one or more embodiments, the height to surface area (H/SA) ratio of the disposable cutting board 100 can be determined by dividing the height (H) of the disposable cutting board 100 by the surface area (SA) of the bottom panel 110, for example, the ratio of H/SA. In some examples, the height to surface area (H/SA) ratio of the disposable cutting board 100 can be a low of about $3 \times 10^{-4}$ cm$^{-1}$, about $5 \times 10^{-4}$ cm$^{-1}$, or about $7 \times 10^{-4}$ cm$^{-1}$ to a high of about $1.8 \times 10^{-3}$ cm$^{-1}$, about $2 \times 10^{-3}$ cm$^{-1}$, about $2.2 \times 10^{-3}$ cm$^{-1}$, or about $3.3 \times 10^{-3}$ cm$^{-1}$. In other examples, the height to surface area (H/SA) ratio of the disposable cutting board 100 can be a low of about $8 \times 10^{-4}$ cm$^{-1}$, about $9 \times 10^{-4}$ cm$^{-1}$, about $1 \times 10^{-3}$ cm$^{-1}$, or about $1.1 \times 10^{-3}$ cm$^{-1}$ to a high of about $1.6 \times 10^{-3}$ cm$^{-1}$, about $1.7 \times 10^{-3}$ cm$^{-1}$, about $1.9 \times 10^{-3}$ cm$^{-1}$, or about $2.2 \times 10^{-3}$ cm$^{-1}$. In some examples, the height to surface area (H/SA) ratio of the disposable cutting board 100 can be about $3 \times 10^{-4}$ cm$^{-1}$ to about $4 \times 10^{-3}$ cm$^{-1}$, about $3 \times 10^{-4}$ cm$^{-1}$ to about $3.5 \times 10^{-3}$ cm$^{-1}$, about $3 \times 10^{-4}$ cm$^{-1}$ to about $3.3 \times 10^{-3}$ cm$^{-1}$, about $3 \times 10^{-4}$ cm$^{-1}$ to about $3 \times 10^{-3}$ cm$^{-1}$, about $3 \times 10^{-4}$ cm$^{-1}$ to about $2 \times 10^{-3}$ cm$^{-1}$, about $3 \times 10^{-4}$ cm$^{-1}$ to about $1 \times 10^{-3}$ cm$^{-1}$, about $3 \times 10^{-4}$ cm$^{-1}$ to about $9 \times 10^{-4}$ cm$^{-1}$, about $3 \times 10^{-4}$ cm$^{-1}$ to about $7 \times 10^{-4}$ cm$^{-1}$, about $3 \times 10^{-4}$ cm$^{-1}$ to about $5 \times 10^{-4}$ cm$^{-1}$, about $3 \times 10^{-4}$ cm$^{-1}$ to about $3 \times 10^{-4}$ cm$^{-1}$, or about $3 \times 10^{-4}$ cm$^{-1}$ to about $2 \times 10^{-4}$ cm$^{-1}$. In some examples, the height to surface area (H/SA) ratio of the disposable cutting board 100 can be about $8 \times 10^{-4}$ cm$^{-1}$ to about $2 \times 10^{-3}$ cm$^{-1}$, about $8 \times 10^{-4}$ cm$^{-1}$ to about $1.9 \times 10^{-3}$ cm$^{-1}$, about $8 \times 10^{-4}$ cm$^{-1}$ to about $1.7 \times 10^{-3}$ cm$^{-1}$, about $8 \times 10^{-4}$ cm$^{-1}$ to about $1.6 \times 10^{-3}$ cm$^{-1}$, about $1 \times 10^{-3}$ cm$^{-1}$ to about $2 \times 10^{-3}$ cm$^{-1}$, about $1 \times 10^{-3}$ cm$^{-1}$ to about $1.9 \times 10^{-3}$ cm$^{-1}$, about $1 \times 10^{-3}$ cm$^{-1}$ to about $1.7 \times 10^{-3}$ cm$^{-1}$, or about $1 \times 10^{-3}$ cm$^{-1}$ to about $1.6 \times 10^{-3}$ cm$^{-1}$.

The disposable cutting board 100 can have a capacity volume (CV). The capacity volume (CV) is the volume defined and contained by the boundaries of the bottom panel 110, the inner sidewall 120, and a plane extending across the first end 132 of the flange 130. The capacity volume (CV) can range from a low of about 100 cm$^3$, about 200 cm$^3$, or about 250 cm$^3$ to a high of about 300 cm$^3$, about 500 cm$^3$, about 1,000 cm$^3$, about 1,500 cm$^3$, about 2,000 cm$^3$, about 3,000 cm$^3$. In other examples, the capacity volume (CV) of the disposable cutting board 100 can be about 200 cm$^3$ to about 2,000 cm$^3$, about 200 cm$^3$ to about 1,000 cm$^3$, about 200 cm$^3$ to about 800 cm$^3$, about 200 cm$^3$ to about 700 cm$^3$, about 200 cm$^3$ to about 600 cm$^3$, about 200 cm$^3$ to about 500 cm$^3$, about 200 cm$^3$ to about 450 cm$^3$, about 200 cm$^3$ to about 400 cm$^3$, about 200 cm$^3$ to about 350 cm$^3$, or about 200 cm$^3$ to about 300 cm$^3$.

As shown below, it has been surprisingly and unexpectedly discovered that a disposable cutting board can maintain a high degree of rigidity despite having a relatively large surface area and low profile. More specifically, it has been surprisingly and unexpectedly discovered that a disposable cutting board can have an FPI rigidity of about 85 grams or greater, such as, for example, about 120 grams, about 140 grams, about 160 grams, or about 180 grams, as measured by the Foodservice Packaging Institute rigidity system standard expressed in grams of force per 0.5 inches of deflection, and can have, for example, a height to characteristic diameter (H/CD) ratio of about 0.01 to about 0.09, a height to surface area (H/SA) ratio of about $8.8 \times 10^{-4}$ cm$^{-1}$ to about $1.3 \times 10^{-3}$ cm$^{-1}$, a capacity volume (CV) of about 200 cm$^3$ to about 2,000 cm$^3$, a basis weight of about 150 lbs/3,000 ft$^2$ to about 300 lbs/3,000 ft$^2$ and/or a caliper of about 13 mils to about 27 mils. It has also been surprisingly and unexpectedly discovered that a disposable cutting board having a product perimeter (P1) can be formed from a generally planar paperboard blank having blank perimeter (P2) such that a product to blank perimeter (P1/P2) ratio can be about 95% to about 99%.

Embodiments of the present disclosure further relate to any one or more of the following paragraphs:

1. A disposable cutting board, comprising: a bottom panel having a surface area (SA) of about 300 cm$^2$ to about 1,000 cm$^2$; a sidewall extending upwardly from the bottom panel; a flange portion that extends outwardly from the sidewall; a first annular transition extending upwardly and outwardly from the bottom panel to a first end of the sidewall; and a second annular transition extending outwardly from a second end of the sidewall to a first end of the flange, wherein: the disposable cutting board has a height (H) of about 3 mm to about 10 mm, the disposable cutting board has an FPI rigidity of about 85 grams or more, as measured by the Foodservice Packaging Institute rigidity system standard expressed in grams of force per 0.5 inches of deflection, and the disposable cutting board has a product to blank perimeter (P1/P2) ratio of about 90% to about 99%, wherein P1 is defined by the outermost circumference of the disposable cutting board, and P2 is defined by the outermost circumference of the generally planar paperboard blank.

2. A disposable cutting board, comprising: a bottom panel having a surface area (SA) of about 300 cm$^2$ to about 1,000 cm$^2$; a sidewall extending upwardly from the bottom panel; a flange portion that extends outwardly from the sidewall; a first annular transition extending upwardly and outwardly from the bottom panel to a first end of the sidewall; and a second annular transition extending outwardly from a second end of the sidewall to a first end of the flange, wherein: the disposable cutting board has a height (H) of about 3 mm to about 10 mm, the disposable cutting board has an FPI rigidity of about 85 grams or more, as measured by the Foodservice Packaging Institute rigidity system standard expressed in grams of force per 0.5 inches of deflection.

3. The disposable cutting board of paragraph 1, wherein the product to blank perimeter (P1/P2) ratio is about 95% to about 99%.

4. The disposable cutting board of paragraph 1 or 3, wherein the product to blank perimeter (P1/P2) ratio is about 96% to about 98%, and wherein the sidewall extends upwardly and outwardly from the bottom panel at an angle of about 100° to about 120°.

5. The disposable cutting board of paragraph 2, wherein the disposable cutting board comprises pulp molded paperboard.

6. The disposable cutting board of any of the paragraphs 1-5, wherein the sidewall extends upwardly from the bottom panel at an angle of about 95° to about 135°.

7. The disposable cutting board of any of the paragraphs 1-6, wherein the sidewall extends upwardly and outwardly from the bottom panel at an angle of about 100° to about 120°.

8. The disposable cutting board of any of the paragraphs 1-7, wherein the disposable cutting board has a capacity volume (CV) of about 200 cm$^3$ to about 2,000 cm$^3$, and wherein the capacity volume (CV) is defined by the boundaries of the bottom panel, the sidewall, and a plane extending across the first end of the flange.

9. The disposable cutting board of paragraph 8, wherein the capacity volume (CV) is about 300 cm$^3$ to about 1,000 cm$^3$, and wherein the FPI rigidity is about 95 grams or greater, as measured by the Foodservice Packaging Institute rigidity system standard expressed in grams of force per 0.5 inches of deflection.

10. The disposable cutting board of any of the paragraphs 1-9, wherein the disposable cutting board has a polygonal shape with angled corners or rounded corners.

11. The disposable cutting board of paragraph 10, wherein the polygonal shape has at least two arched sides.

12. The disposable cutting board of paragraph 10, wherein the polygonal shape has at least two arched sides opposite of each other and at least two straight sides opposite and parallel of each other.

13. The disposable cutting board of any of the paragraphs 1-12, wherein the disposable cutting board has a height to surface area (H/SA) ratio of about $3\times10^{-4}$ cm$^{-1}$ to about $3.3\times10^{-3}$ cm$^{-1}$.

14. The disposable cutting board of any of the paragraphs 1-13, wherein the disposable cutting board has a height to surface area (H/SA) ratio of about $1\times10^{-3}$ cm$^{-1}$ to about $1.7\times10^{-3}$ cm$^{-1}$.

15. The disposable cutting board of any of the paragraphs 1-14, wherein the disposable cutting board is polygonal having an outer length, an outer width, and a characteristic diameter (CD) that is an average of the outer length and the outer width, and wherein the disposable cutting board has a height to characteristic diameter (H/CD) ratio of about 0.01 to about 0.07.

16. The disposable cutting board of paragraph 15, wherein the height (H) is about 4 mm to about 8 mm and the height to characteristic diameter (H/CD) ratio is about 0.01 to about 0.05.

17. The disposable cutting board of paragraph 15, wherein the outer length is about 20 cm to about 50 cm, the outer width is about 10 cm to about 40 cm, and the height to characteristic diameter (H/CD) ratio is about 0.01 to about 0.05.

18. The disposable cutting board of any of the paragraphs 1-17, further comprising a basis weight of about 150 lbs/3,000 ft$^2$ to about 300 lbs/3,000 ft$^2$ and a caliper of about 13 mils to about 27 mils.

19. A disposable cutting board, comprising: a bottom panel having a surface area (SA) of about 300 cm$^2$ to about 1,000 cm$^2$; a sidewall extending upwardly from the bottom panel; a flange portion that extends outwardly from the sidewall; a first annular transition extending upwardly and outwardly from the bottom panel to a first end of the sidewall; and a second annular transition extending outwardly from a second end of the sidewall to a first end of the flange, wherein: the disposable cutting board has a height (H) of about 3 mm to about 10 mm, and the disposable cutting board has a product to blank perimeter (P1/P2) ratio of about 90% to about 99%, wherein P1 is defined by the outermost circumference of the disposable cutting board, and P2 is defined by the outermost circumference of the generally planar paperboard blank.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:

1. A disposable cutting board formed from a paperboard blank, comprising:
    a bottom panel having a surface area (SA) of 300 cm$^2$ to about 1,000 cm$^2$;
    a sidewall extending upwardly from the bottom panel;
    a flange portion that extends outwardly from the sidewall;
    a first annular transition extending upwardly and outwardly from the bottom panel to a first end of the sidewall;
    a second annular transition extending outwardly from a second end of the sidewall to a first end of the flange; and
    an evert extending outwardly from a second end of the flange, wherein:
        the disposable cutting board has a height (H) of about 3 mm to about 10 mm, and
        the disposable cutting board has a product to blank perimeter (P1/P2) ratio of about 90% to about 99%, wherein P1 is defined by the outermost perimeter of the disposable cutting board, and P2 is defined by the outermost perimeter of the paperboard blank.

2. The disposable cutting board of claim 1, wherein the sidewall extends upwardly from the bottom panel at an angle of about 95° to about 135°.

3. The disposable cutting board of claim 1, wherein the product to blank perimeter (P1/P2) ratio is about 95% to about 99%.

4. The disposable cutting board of claim 1, wherein the product to blank perimeter (P1/P2) ratio is about 96% to about 98%, and wherein the sidewall extends upwardly and outwardly from the bottom panel at an angle of about 100° to about 120°.

5. The disposable cutting board of claim 1, wherein the disposable cutting board has a capacity volume (CV) of about 200 cm$^3$ to about 2,000 cm$^3$, and wherein the capacity volume (CV) is defined by the boundaries of the bottom panel, the sidewall, and a plane extending across the first end of the flange.

6. The disposable cutting board of claim 5, wherein the capacity volume (CV) is about 300 cm$^3$ to about 1,000 cm$^3$.

7. The disposable cutting board of claim 1, wherein the disposable cutting board has a polygonal shape with angled corners or rounded corners.

8. The disposable cutting board of claim 7, wherein the polygonal shape has at least two arched sides.

9. The disposable cutting board of claim 7, wherein the polygonal shape has at least two arched sides opposite of each other and at least two straight sides opposite and parallel of each other.

10. The disposable cutting board of claim 1, wherein the disposable cutting board has a height to surface area (H/SA) ratio of about $3\times10^{-4}$ cm$^{-1}$ to about $3.3\times10^{-3}$ cm$^{-1}$.

11. The disposable cutting board of claim 1, wherein the disposable cutting board has a height to surface area (H/SA) ratio of about $1\times10^{-3}$ cm$^{-1}$ to about $1.7\times10^{-3}$ cm$^{-1}$.

12. The disposable cutting board of claim 1, wherein the disposable cutting board is polygonal having an outer length, an outer width, and a characteristic diameter (CD) that is an average of the outer length and the outer width, and wherein the disposable cutting board has a height to characteristic diameter (H/CD) ratio of about 0.01 to about 0.07.

13. The disposable cutting board of claim 12, wherein the height (H) is about 4 mm to about 8 mm and the height to characteristic diameter (H/CD) ratio is about 0.01 to about 0.05.

14. The disposable cutting board of claim 12, wherein the outer length is about 20 cm to about 50 cm, the outer width is about 10 cm to about 40 cm, and the height to characteristic diameter (H/CD) ratio is about 0.01 to about 0.05.

15. The disposable cutting board of claim 1, further comprising a basis weight of about 150 lbs/3,000 ft$^2$ to about 300 lbs/3,000 ft$^2$ and a caliper of about 13 mils to about 27 mils.

16. A disposable cutting board formed from a paperboard blank, comprising:
a bottom panel having a surface area (SA) of 300 cm$^2$ to about 1,000 cm$^2$;
a sidewall extending upwardly from the bottom panel;
a flange portion that extends outwardly from the sidewall;
a first annular transition extending upwardly and outwardly from the bottom panel to a first end of the sidewall; and
a second annular transition extending outwardly from a second end of the sidewall to a first end of the flange, wherein the disposable cutting board has a height (H) of 3 mm to 10 mm and a height to surface area (H/SA) ratio of $1 \times 10^{-3}$ cm$^{-1}$ to $1.7 \times 10^{-3}$ cm$^{-1}$.

17. The disposable cutting board of claim 16, wherein the disposable cutting board comprises pulp molded paperboard.

18. The disposable cutting board of claim 16, wherein the sidewall extends upwardly from the bottom panel at an angle of about 95° to about 135°.

19. The disposable cutting board of claim 16, wherein the disposable cutting board has a product to blank perimeter (P1/P2) ratio of about 96% to about 98%, and wherein the sidewall extends upwardly and outwardly from the bottom panel at an angle of about 100° to about 120°.

20. The disposable cutting board of claim 16, wherein the disposable cutting board has a capacity volume (CV) of about 200 cm$^3$ to about 2,000 cm$^3$, and wherein the capacity volume (CV) is defined by the boundaries of the bottom panel, the sidewall, and a plane extending across the first end of the flange.

21. The disposable cutting board of claim 16, wherein the disposable cutting board has a polygonal shape with angled corners or rounded corners, at least two arched sides opposite of each other, and at least two straight sides opposite and parallel of each other.

22. The disposable cutting board of claim 16, wherein the disposable cutting board has a basis weight of about 150 lbs/3,000 ft$^2$ to about 300 lbs/3,000 ft$^2$, and a caliper of about 13 mils to about 27 mils.

23. The disposable cutting board of claim 16, wherein the disposable cutting board is polygonal having an outer length, an outer width, and a characteristic diameter (CD) that is an average of the outer length and the outer width, and wherein the disposable cutting board has a height to characteristic diameter (H/CD) ratio of about 0.01 to about 0.07.

24. The disposable cutting board of claim 23, wherein the height (H) is about 4 mm to about 8 mm and the height to characteristic diameter (H/CD) ratio is about 0.01 to about 0.05.

25. The disposable cutting board of claim 23, wherein the outer length is about 20 cm to about 50 cm, the outer width is about 10 cm to about 40 cm, and the height to characteristic diameter (H/CD) ratio is about 0.01 to about 0.05.

26. A disposable cutting board formed from a paperboard blank, comprising:
a bottom panel having a surface area (SA) of 300 cm$^2$ to about 1,000 cm$^2$;
a sidewall extending upwardly from the bottom panel;
a flange portion that extends outwardly from the sidewall;
a first annular transition extending upwardly and outwardly from the bottom panel to a first end of the sidewall; and
a second annular transition extending outwardly from a second end of the sidewall to a first end of the flange, wherein:
the disposable cutting board has a height (H) of about 3 mm to about 10 mm, and
the disposable cutting board has a product to blank perimeter (P1/P2) ratio of about 90% to about 99%, wherein P1 is defined by the outermost perimeter of the disposable cutting board, and P2 is defined by the outermost perimeter of the paperboard blank.

27. The disposable cutting board of claim 26, wherein the sidewall extends upwardly from the bottom panel at an angle of about 95° to about 135°.

28. The disposable cutting board of claim 26, wherein the product to blank perimeter (P1/P2) ratio is about 96% to about 98%, and wherein the sidewall extends upwardly and outwardly from the bottom panel at an angle of about 100° to about 120°.

29. The disposable cutting board of claim 26, wherein the disposable cutting board has a capacity volume (CV) of about 200 cm$^3$ to about 2,000 cm$^3$, and wherein the capacity volume (CV) is defined by the boundaries of the bottom panel, the sidewall, and a plane extending across the first end of the flange.

30. The disposable cutting board of claim 26, wherein the disposable cutting board has a polygonal shape with angled corners or rounded corners, at least two arched sides opposite of each other, and at least two straight sides opposite and parallel of each other.

31. The disposable cutting board of claim 26, wherein the disposable cutting board has a height to surface area (H/SA) ratio of about $1 \times 10^{-3}$ cm$^{-1}$ to about $1.7 \times 10^{-3}$ cm$^{-1}$, a basis weight of about 150 lbs/3,000 ft$^2$ to about 300 lbs/3,000 ft$^2$, and a caliper of about 13 mils to about 27 mils.

32. The disposable cutting board of claim 26, wherein the disposable cutting board is polygonal having an outer length, an outer width, and a characteristic diameter (CD) that is an average of the outer length and the outer width, and wherein the disposable cutting board has a height to characteristic diameter (H/CD) ratio of about 0.01 to about 0.07.

33. The disposable cutting board of claim 32, wherein the height (H) is about 4 mm to about 8 mm and the height to characteristic diameter (H/CD) ratio is about 0.01 to about 0.05.

34. The disposable cutting board of claim 32, wherein the outer length is about 20 cm to about 50 cm, the outer width is about 10 cm to about 40 cm, and the height to characteristic diameter (H/CD) ratio is about 0.01 to about 0.05.

35. The disposable cutting board of claim 26, further comprising a recessed channel formed in the bottom panel.

\* \* \* \* \*